(12) United States Patent
Berke et al.

(10) Patent No.: US 12,277,323 B2
(45) Date of Patent: Apr. 15, 2025

(54) DISTRIBUTED REGION TRACKING FOR TIERED MEMORY SYSTEMS

(71) Applicant: DELL PRODUCTS L.P., Round Rock, TX (US)

(72) Inventors: Stuart Allen Berke, Austin, TX (US); William Price Dawkins, Lakeway, TX (US)

(73) Assignee: Dell Products L.P., Round Rock, TX (US)

( * ) Notice: Subject to any disclaimer, the term of this patent is extended or adjusted under 35 U.S.C. 154(b) by 273 days.

(21) Appl. No.: 17/871,708

(22) Filed: Jul. 22, 2022

(65) Prior Publication Data

US 2024/0028209 A1 Jan. 25, 2024

(51) Int. Cl.
*G06F 3/06* (2006.01)
*G06F 12/0802* (2016.01)
*G06F 13/28* (2006.01)

(52) U.S. Cl.
CPC .......... *G06F 3/0613* (2013.01); *G06F 3/0647* (2013.01); *G06F 3/0673* (2013.01); *G06F 13/28* (2013.01); *G06F 12/0802* (2013.01); *G06F 2212/1016* (2013.01)

(58) Field of Classification Search
None
See application file for complete search history.

(56) References Cited

U.S. PATENT DOCUMENTS

| 9,189,387 | B1 | 11/2015 | Taylor et al. | |
| 9,513,968 | B1* | 12/2016 | Fiske | G06F 3/0649 |
| 10,437,479 | B2* | 10/2019 | Haghighi | G06F 3/064 |
| 11,003,378 | B2 | 5/2021 | Iyer et al. | |
| 2010/0088460 | A1* | 4/2010 | Jeddeloh | G06F 3/0659 |
| | | | | 711/E12.001 |
| 2016/0021020 | A1* | 1/2016 | Deguchi | G06F 3/067 |
| | | | | 709/226 |

\* cited by examiner

*Primary Examiner* — Farley Abad
*Assistant Examiner* — Dayton Lewis-Taylor
(74) *Attorney, Agent, or Firm* — Larson Newman, LLP

(57) ABSTRACT

An information handling system includes a processor having a first data storage device in a first memory tier, a second data storage device in a second memory tier, and a tiering manager. The first tier exhibits first data storage attributes and the second tier exhibits second data storage attributes. The tiering manager receives first memory access information from the first data storage device and second memory access information from the second data storage device, makes a determination that a first performance level of the information handling system when first data is stored in the first data storage device can be improved to a second performance level of the information handling system by swapping the first data to the second data storage device based upon the first memory access information and the second memory access information, and swaps the first data to the second data storage device in response to the determination.

18 Claims, 3 Drawing Sheets

DISTRIBUTED REGION TRACKING FOR TIERED MEMORY SYSTEMS

FIELD OF THE DISCLOSURE

This disclosure generally relates to information handling systems, and more particularly relates to providing distributed region tracking in a compute express link (CXL) information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor having a first data storage device in a first memory tier, a second data storage device in a second memory tier, and a tiering manager. The first tier may exhibit first data storage attributes and the second tier may exhibit second data storage attributes. The tiering manager may receive first memory access information from the first data storage device and second memory access information from the second data storage device, make a determination that a first performance level of the information handling system when first data is stored in the first data storage device can be improved to a second performance level of the information handling system by swapping the first data to the second data storage device based upon the first memory access information and the second memory access information, and swap the first data to the second data storage device in response to the determination.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
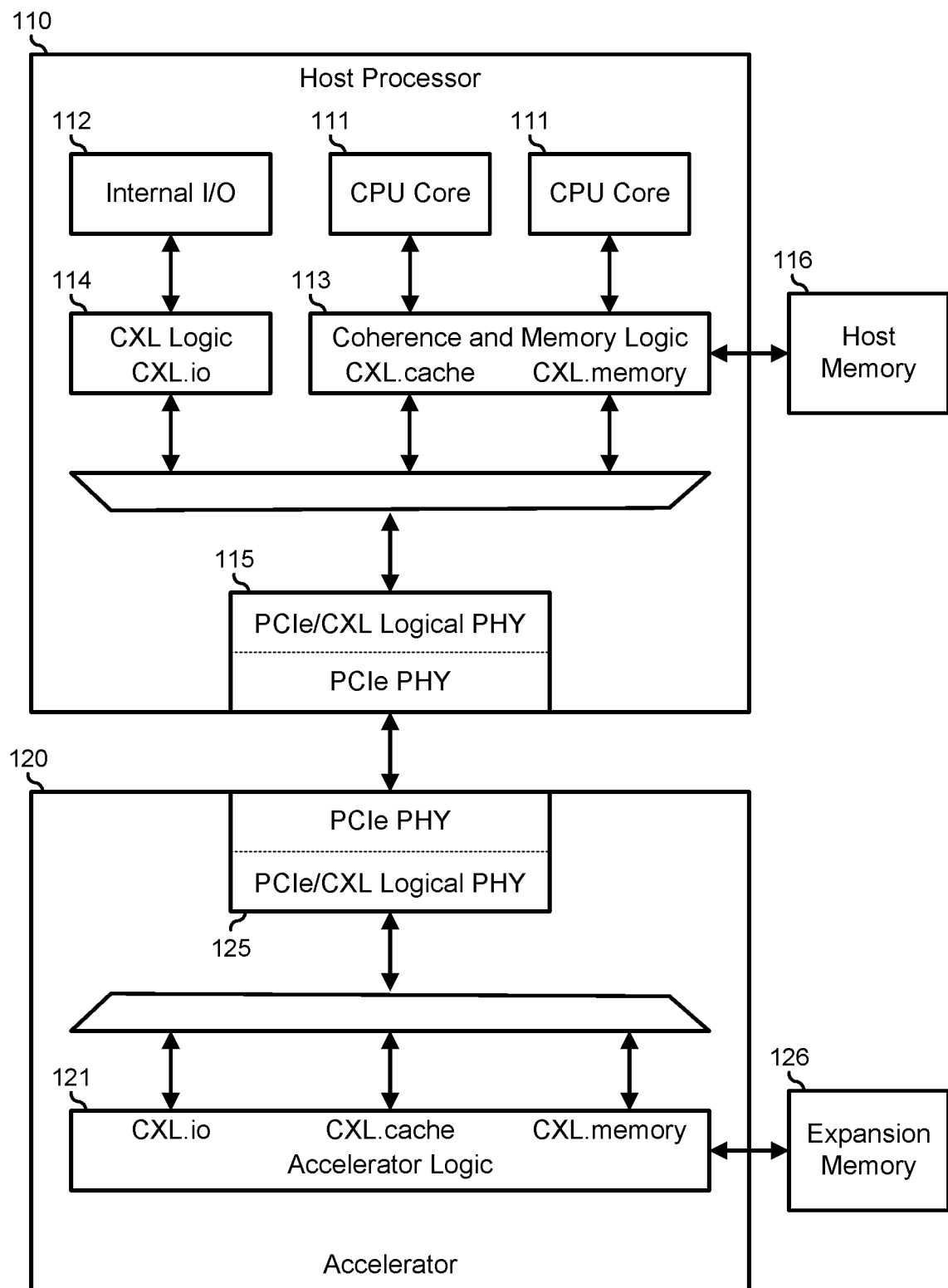
FIG. 1 is a block diagram of a compute express link (CXL) information handling system according to an embodiment of the current disclosure.

FIG. 1 shows an information handling system 100, including a host processor 110 with associated host memory 116, and an accelerator device 120 with associated expansion memory 126. Host processor 110 includes one or more processor core 111, various internal input/output (I/O) devices 112, coherence and memory logic 113, compute express link (CXL) logic 114, and a PCIe physical layer (PHY) interface 115. Coherence and memory logic 113 provides cache coherent access to host memory 116. The operation of a host processor, and particularly of the component functional blocks within a host processor, are known in the art, and will not be further described herein, except as needed to illustrate the current embodiments.

Accelerator device 120 includes accelerator logic 121, and a PCIe PHY interface 125 that is connected to PCIe PHY interface 115. Accelerator logic 121 provides access to expansion memory 126. Accelerator device 120 represents a hardware device configured to enhance the overall performance of information handling system 100. An examples of accelerator device 120 may include a smart network interface card (MC) or host bus adapter (HBA), a graphics processing unit (GPU), field programmable gate array (FPGA), or application specific integrated circuit (ASIC) device, a memory management and expansion device or the like, or another type of device configured to improve the performance of information handling system 100, as needed or desired. In particular, being coupled to host processor 110 via the PCIe link established between PCIe interfaces 115 and 125, accelerator device 120 may represent a task-based device that receives setup instructions from the host processor, and then independently executes the tasks specified by the setup instructions. In such cases, accelerator device 120 may access host memory 116 via a direct memory access (DMA.) device or DMA function instantiated on the host processor. When representing a memory management device, accelerator device 120 may represent a device configured to provide an expanded memory capacity, in the form of expansion memory 126, thereby increasing the overall storage capacity of information handling system 100, or may represent a memory capacity configured to increase the memory bandwidth of the information handling system, as needed or desired.

Information handling system 100 represents an information handling system configured in conformance with a CXL standard, such as a CXL 1.1 specification, a CXL 2.0 specification, or any other CXL standard as may be published from time to time by the CXL Consortium. The CXL standard is an industry-supported interconnection standard that provides a cache-coherent interconnection between processors, accelerator devices, memory expansion devices, or other devices, as needed or desired. In this way, operations performed at diverse locations and by diverse architectures may maintain a memory coherency domain across the entire platform. The CXL standard provides for three (3) related protocols: CXL.io, CXL.cache, and CXL.memory. The CXL.io protocol represents an I/O protocol that is based upon the PCIe 5.0 protocol (for CXL specification 1.1 and 2.0) or the PCIe 6.0 protocol (for CXL specification 3.0).

For example, the CXL.io protocol provides for device discovery, configuration, and initialization, interrupt and DMA handling, and I/O virtualization functions, as needed or desired. The CXL.cache protocol provides for processors to maintain a cache-coherency domain with accelerator devices and their attached expansion memory, and with capacity- and bandwidth-based memory expansion devices, as needed or desired. The CXL.memory protocol permits processors and the like to access memory expansion devices in a cache-coherency domain utilizing load/store-based commands, as needed or desired. Further, the CXL.memory protocol permits the use of a wider array of memory types than may be supported by processor 110. For example, a processor may not provide native support for various types of non-volatile memory devices, such as Intel Optane Persistent Memory, but the targeted installation of an accelerator device that supports Intel Optane Persistent Memory may permit the information handling system to utilize such memory devices, as needed or desired.

In this regard, host processor 110 and accelerator device 120 each include logic and firmware configured to instantiate the CXL.io, CXL.cache, and CXL.memory protocols. In particular, within host processor 110, coherence and memory logic 113 instantiates the functions and features of the CXL.cache and CXL.memory protocols, and CXL logic 114 implements the functions and features of the CXL.io protocol. Further, PCIe PHY 115 instantiates a virtual CXL logical PHY. Likewise, within accelerator device 120, accelerator logic 121 instantiates the CXL.io, CXL.cache, and CXL.memory protocols, and PCIe PHY 125 instantiates a virtual CXL logical PHY. Within a CXL enabled accelerator device such as accelerator device 120, both the CXL.cache and CXL.memory protocols do not have to be instantiated, as needed or desired, but any CXL enabled accelerator device must instantiate the CXL.io protocol.

In a particular embodiment, the CXL standard provides for the initialization of information handling system 100 with a heavy reliance on existing PCIe device and link initialization processes. In particular, when information handling system 100 is powered on, the PCIe device enumeration process operates to identify accelerator 120 as a CXL device, and that the operations of the accelerator, in addition to providing for standard PCIe operation, functions, and features, may be understood to provide for additional CXL operation, functions, and features. For example, accelerator 120 will be understood to enable CXL features such as global memory flush, CXL reliability, availability, and serviceability (RAS) features, CXL metadata support, and the like. In addition to the enablement of the various CXL operation, functions, and features, accelerator 120 will be understood to enable operations at higher interface speeds, such as 16 giga-transfers per second (GT/s) or 32 GT/s.

Figure 2:
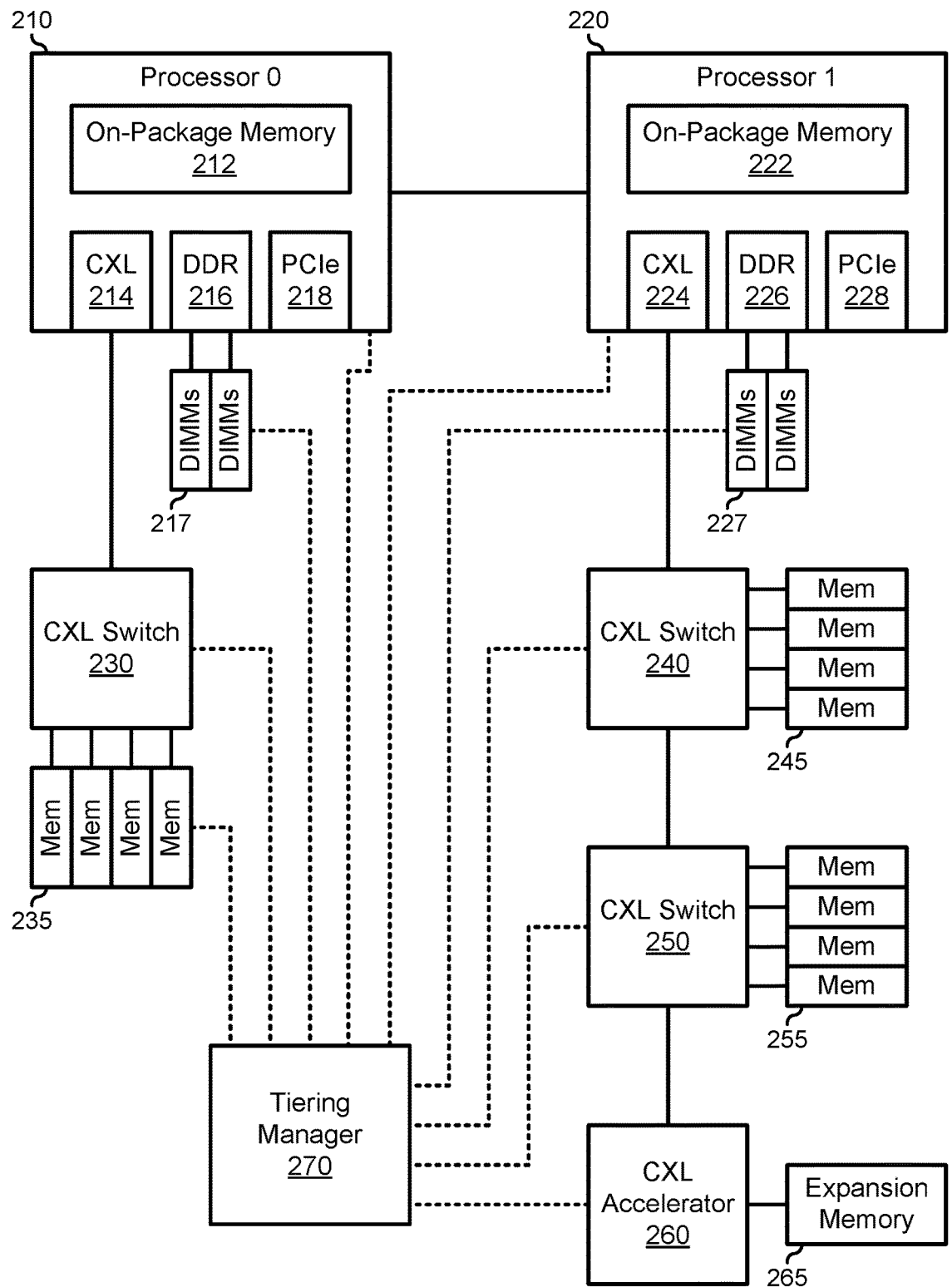
FIG. 2 is a block diagram of a CXL information handling system according to another embodiment of the current disclosure.

FIG. 2 illustrates a CXL information handling system 200 including processors 210 and 220, CXL switches 230, 240, and 250, a CXL accelerator 260, and a tiering manager 270. Processor 210 includes on-package memory 212, a CXL interface 214, a double data rate (DDR) memory controller 216, and a PCIe interface 218. On-package memory 212 typically represents a small-capacity memory that is close to the processing elements of processor 210, and therefore is typically accessed more quickly than other memory devices of information handling system 200. On-package memory 212 may include one or more level of cache memory, non-volatile memory, or other memory that is provided as a portion of the system physical address space of information handling system 200, as needed or desired. CXL interface 214 is similar to PCIe PHY 115 as described above, and provides an interface to connect to CXL switch 230.

DDR memory controller 216 represents a memory controller that is integrated into processor 210, and that operates in accordance with a particular DDR standard, such as a third generation DDR standard (DDR3), a fourth generation DDR standard (DDR4), a fifth generation DDR standard (DDR5), or a future DDR standard, as needed or desired. Here, DDR memory controller 216 is connected to one or more Dual In-Line Memory Module (DIMM) 217. DIMM module 217 is provided in accordance with a common DDR standard with DDR memory controller 216. DDR memory controller 216 and the connected DIMM 217 provide processor 210 with a larger memory space than is typically provided by on-package memory 212, but that has a somewhat longer access time than the on-package memory, and, along with DIMM 227 as described below, it typically described as the main memory of information handling system 200. The details of the various DDR standards, and the interactions between DDR memory controllers and DDR DIMMs is known in the art, and will not be further described herein, except as may be needed to illustrate the current embodiments.

PCIe interface 218 provides processor 210 with expansion capabilities for the connecting of various add-in devices as needed or desired. PCIe interface 218 may typically be connected to a smart NIC or HBA to provide network access for information handling system 200, to a storage controller to access one or more data storage devices, or the like. In any case, PCIe interface 218 may be coupled to one or more storage device that is not included in the CXL domain provided on information handling system 200, and in particular, may not reside within the coherency domain as provided on the information handling system.

Processor 220 is similar to processor 210, and includes on-package memory 222, a CXL interface 224, a DDR memory controller 226, and a PCIe interface 228. On-package memory 222 is similar to on-package memory 212, and may include one or more level of cache memory, non-volatile memory, or other memory that is provided as a portion of the system physical address space of information handling system 200, as needed or desired. CXL interface 224 is similar to CXL interface 214, and provides an interface to connect to CXL switch 240. DDR memory controller 226 is similar to DDR memory controller 216, and is connected to one or more DIMM 227. DDR memory controller 226 and DIMM module 217 are provided in accordance with a common DDR standard, which is typically also common with DDR standard associated with DDR memory controller 216 and DIMM 217. Processor 210 and processor 220 may be connected together by one or more inter-processor interface, as needed or desired, such that DDR memory controllers 216 and 226, and respective DIMMs 217 and 218 provide the processors with a larger main memory for information handling system 200. PCIe interface 228 is similar to PCIe interface 218, and provides expansion capabilities for the connecting of various add-in devices as needed or desired.

CXL switches 230, 240, and 250 represent switching devices that are connected upstream by a PCIe/CXL interface with a particular link width, and switch the upstream traffic to, typically, a greater number of downstream links. For example, where CXL switch 230 is connected to CXL interface 214 by a ×16 link, the CXL switch may provide four (4) ×8 downstream links, each to a memory riser device 235. The ×16 upstream link may present a bandwidth limit to the data stored on memory riser devices 235. However, where the data stored on memory riser devices 235 are provided in order to increase the overall data storage capacity of information handling system 200, such a configuration may be deemed to be advantageous. On the other hand, where data bandwidth is deemed to be more advantageous, CXL switch 230 may provide two (2) ×8 downstream links to only two (2) memory risers. The upstream ×16 link would not be seen as presenting a bandwidth limit. Thus the use of CXL switches 230, 240, and 250 provide a high degree of flexibility of configuration for information handling system 200, as needed or desired. CXL switch 240 is connected upstream to CXL interface 224, and includes memory riser devices 245 on downstream links. Similarly, CXL switch 250 is connected upstream to CXL switch 240, and includes memory riser devices 255 on downstream links. CXL accelerator 260 is connected upstream to CXL switch 250 and includes an expansion memory 265.

Information handling system 200 presents a deep and varied data storage hierarchy. In particular, processors 210 and 220 each include small, but very low latency data storage capacity in a first tier including on-package memories 212 and 222, and larger, but somewhat slower data storage capacity in a second tier including DIMMs 217 and 227. Memory riser devices 235 and 245 represent a third tier with longer latencies but with potentially much larger capacities. In a fourth tier, memory riser devices 255 are a step further from processors 210 and 220, but may include similar data storage capacities as memory riser devices 235 and 245. In a fifth tier, expansion memory 265 has even longer latency than memory riser devices 255, and may include varying capacity, based upon the needs of CXL accelerator 260.

Finally, in a sixth tier, data that is stored and accessed via PCIe interfaces 218 and 228 will typically have very long latency times, but may represent virtually unlimited data storage capacity. The descriptions of the tiers and the latencies are highly simplified, and the latency for any particular block of data with respect to a particular one of processors 210 and 220 will be different than the latency for that same block with respect to the other processor. For example, with respect to processor 210, data stored in on-package memory 212 will exhibit substantially zero (0) latency, but with respect to processor 220, the same data will exhibit a latency associated with transactions on the interprocessor interface. Thus, while a particular processor may manage tiering operations within its own hierarchy, the management of tiering across processors is a greater challenge.

Tiering manager 270 represents a management system instantiated within information handling system 200, and configured to monitor, manage, and maintain the tiering organization of the data stored on the information handling system. The elements of information handling system 200 operate to track access rates for the data stored on the information handling system. In particular, agents on each of processors 210 and 220 operate to track the memory accesses performed by their respective processors, and the targets of the memory accesses. Further, one or more of on-package memories 212 and 222, CXL interfaces 214 and 224, and PCIe interfaces 218 and 228 may operate to track access rates for the data stored thereby. As such, tiering manager 270 is illustrated as being connected to processors 210 and 220. Further, CXL switches 230, 240, and 250, and CXL accelerator 260 track access rates for the data stored thereby, and are illustrated as being connected to tiering manager 270. Finally, various of the individual data storage elements, such as DIMMs 217 and 227, and memory riser modules 235 may track access rates for the data stored thereby, and are illustrated as being connected to tiering manager 270.

Note that some of the elements of information handling system 200 are not illustrated as being connected to tiering manager 270, such as memory riser devices 245 and 255, and expansion memory 265. Here, it will be understood that such elements may not have a native ability to track the memory accesses, and to provide the usage statistics as described below. In this regard, the elements that are illustrated as being connected to tiering manager 270 (i.e., processors 210 and 220, DIMMs 215 and 225, CXL switches 230, 240, and 250, memory riser devices 235, and CXL accelerator 260), will be understood to include memory access tracking agents that collect the memory access tracking information and that provide the memory access tracking information to the tiering manager. Further, where a particular element is illustrated as not being directly connected to tiering manager, the memory accesses to those memory devices will be understood to be tracked by the element above them in the tiering hierarchy. For example, while memory riser devices 255 are not illustrated as being connected to tiering manager 270, the accesses to the data storage space of those memory riser devices may be tracked by a memory access tracking agent of CXL switch 250. Here, it may be understood that the granularity of the memory access tracking information would be limited to the level of the entire storage capacity of the memory riser device, as the CXL switch may not have access to the storage organization of the memory riser device, but at least to the granularity of the storage capacity of the memory riser device, such a device is able to be included in the tiering hierarchy managed by tiering manager 270.

Each element connected to tiering manager 270 operates to provide its access rate tracking information to the tiering manager. The access rate tracking information may include the memory regions to which the memory accesses are directed. The elements connected to tiering manager 270 may provide access rate tracking based upon paging information from processors 210 and 220, or may be based upon a particular data region granularity, such as by tracking memory regions in megabytes (MB), gigabytes (GB), or another granularity as needed or desired. The elements connected to tiering manager 270 instantiate different time windows for providing the memory access rate tracking information. For example, the elements may track the memory access rates to a particular region per minute, per second (s), per millisecond (ms), or another time window, as needed or desired.

In a particular case, the memory access rate tracking information parameters (region sizes, time windows, etc.) are determined by the elements themselves, and thus the memory access rate tracking information provided to tiering manager 270 may take different forms for different elements. For example, the memory access rate tracing information for on-package memory 212 may be based upon relatively short time windows, and smaller region sizes, while CXL switch 250, being less proximate to processors 210 and 220, may provide memory access rate tracking information for longer time windows and larger region sizes. In another case, tiering manager 270 operates to manage the memory access rate tracking parameters for each element that is connected to the tiering manager, as needed or desired.

Tiering manager 270 operates to manage the placement of the user data within the data storage elements of information handling system 200. In particular, tiering manager 270 operates to optimize the overall performance of information handling system 200 by determining the optimal placement of the user data within the data storage elements. In a particular embodiment, tiering manager 270 deterministically places the user data within the data storage elements. Tiering manager 270 includes a rules-based decision-making process to determine when data should be moved upward in the tiering hierarchy and when data should be moved downward. In an exemplary case, a simple rule based upon raw access rate information may provide that a comparison of the access rate information for various blocks of user data results in the blocks of data with higher access rates being moved upwards, and blocks with lower access rates being moved downwards.

Another case may include tiering manager 270 operating to direct one or more of the elements of information handling system 200 to sub-sample the access rates for the user data stored thereon. For example, assume one of memory riser devices 245 is exhibiting a high access rate, that the block size of sampling performed by CXL switch 240 is in 1 GB blocks, and the largest block size manageable by any higher tier storage device is 100 MB. Here, the high access rate information may not be fine-grained enough to warrant movement of the user data stored on memory riser device 245, if the high access rate is driven by data access requests more or less evenly spaced through a particular 1 GB block. Tiering manager 270 may operate to direct CXL switch 240 to monitor and provide access rate information for the particular one of memory riser devices 245 with 100 MB block size to determine if any of the data stored within the particular memory riser device warrants moving upwards in the hierarchy.

In another embodiment, tiering manager 270 employs an artificial intelligence/machine learning (AI/ML) model to model and predict the optimal placement of data within the storage hierarchy of information handling system 200. For example, tiering manager 270 may employ an artificial neural network (ANN) that receives the memory access rate tracking information from the elements of information handling system 200 and processes the information to predict the optimal placement. Additional factors may be taken into account, such as the time of day, day of the week, or day of the month, or other expected traffic metrics, error tracking information such as correctable error rates within the user data storage devices, page table fault information, or page miss rate information from processors 210 and 220, power delivery and throttling information within the various elements of information handling system 200, data throughput and latency information on the various CXL/PCIe links, or other information as needed or desired.

When tiering manager 270 determines that particular user data should be moved upwards or downwards within the hierarchy of information handling system 200, initiates a process to move the data as determined. Tiering manager 270 operates to interrupt the necessary processes in order to execute the determined move. For example, tiering manager 270 may operate to suspend one or more processes or threads on processors 210 and 220 that are utilizing the data to be moved. Tiering manager 270 may provide an interrupt to one of processors 210 or 220 to suspend the particular process or thread. In another case, tiering manager 270 operates to interrupt an operating system (OS) or hypervisor running on one or more of processors 270. In either case, the interrupts are provided in order to avoid memory contention while the data is being moved.

In executing the move of the selected data upwards or downwards in the hierarchy, tiering manager 270 invokes pre-existing data movement hardware and processes within information handling system 200. For example, tiering manager 270 may invoke a hardware direct memory access (DMA) engine to move the data. Information handling system 200 may include DMA engine hardware and process calls that permit the movement of data within the information handling system without involving processor cycles to move the data. An example of a DMA engine may include a smart data accelerator interface (SDXI) memory mover, a memory mover that is proprietary to a particular processor family, or another DMA engine as deeded or desired. After the data is moved, tiering manager 270 adjusts the page tables and translation lookaside buffers (TLBs) in processors 210 and 220 to complete the data move.

In a particular embodiment, tiering manager 270 is configured to receive memory paging information from processors 210 and 220. Tiering manager 270 is further configured to initiate the move of the selected data upwards or downwards in the hierarchy in response to a page fault experienced by one or more of processors 210 and 220. The movement of the data is performed opportunistically when processors 210 and 220 are otherwise managing data moves to meet the processing needs of the processors. In another embodiment, tiering manager 270 operates to move pinned data within the memory hierarchy, and reconfigures the pinning flags to reflect the data move of the pinned data.

In a particular embodiment, tiering manager 270 operates in-band, and is instantiated on one of processors 210 and 220. Processing resources of processors 210 and 220 are utilized in receiving the memory access rate tracking information from the elements of information handling system 200, in determining the memory data moves, and in implementing the process of the data moves. In this case, the illustrated connections between tiering manager 270 and processors 210 and 220, DIMMs 217 and 227, CXL switches 230, 240, and 250, memory riser devices 235, and CXL accelerator 260 may be understood to be in-band data connections utilizing the CXL/PCIe interfaces, and in-band resources of DDR interfaces 216 and 226, as needed or desired. In another embodiment, tiering manager 270 operates out-of-band form processors 210 and 220. Tiering manager 270 may be understood to be implemented on a management network implemented on information handling system 200.

For example, tiering manager 270 may be instantiated as a process on a baseboard management controller (BMC) or other type of management device included on information handling system 200, as needed or desired. In this case, the illustrated connections between tiering manager 270 and processors 210 and 220, DIMMs 217 and 227, CXL switches 230, 240, and 250, memory riser devices 235, and CXL accelerator 260, may be understood to be out-of-band data connections of a management network instantiated on information handling system 200. Such a management network may include various management interfaces, such as inter-integrated circuit (I2C) interfaces, tunneled network interfaces such as a network controller sideband interface (NC-SI), or the like, or other management interfaces, as needed or desired.

Figure 3:
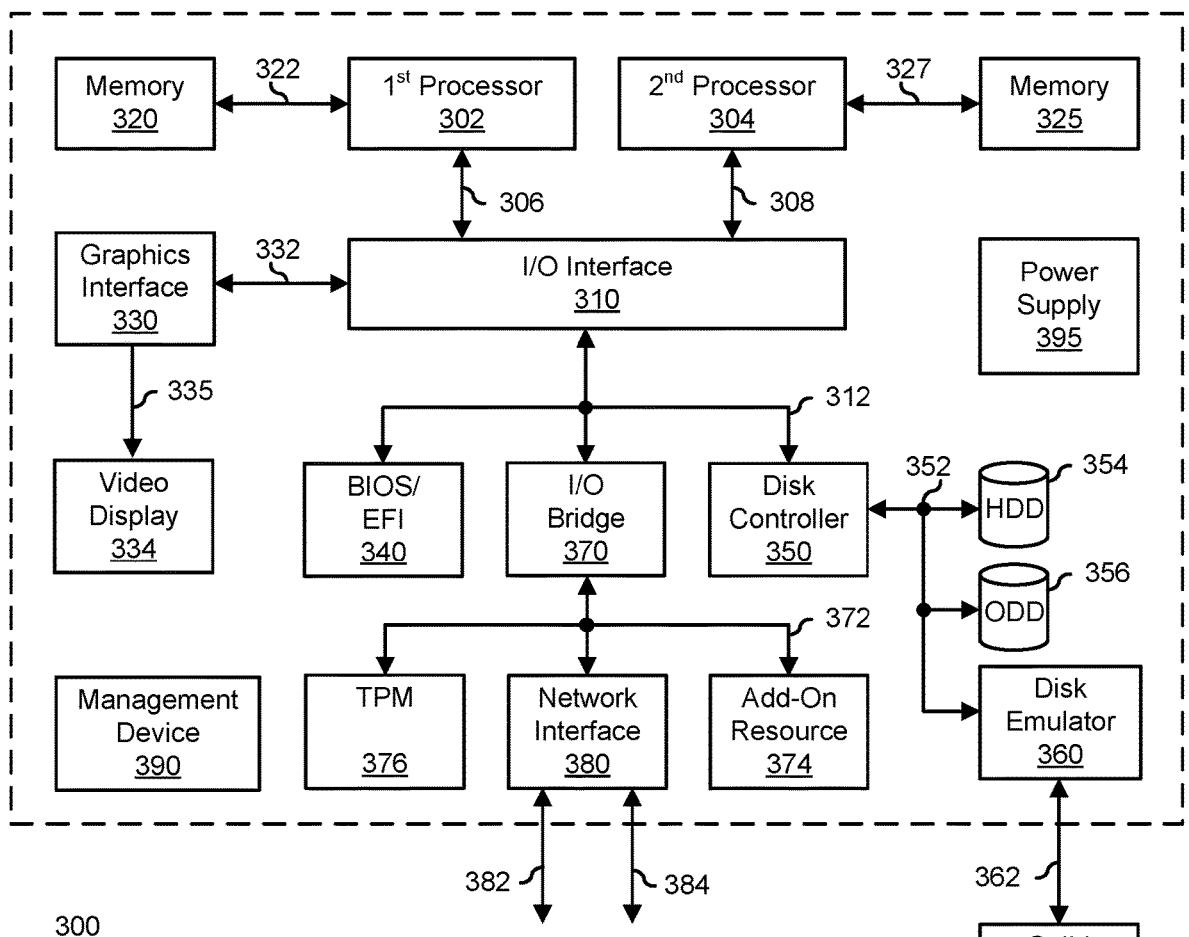
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320 and 325, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a processor including a first data storage device in a first memory tier, the first memory tier exhibiting first data storage attributes, wherein the processor is configured to determine first memory access rate information from the first data storage device;
    a second data storage device in a second memory tier, the second data storage device exhibiting second data storage attributes, wherein the first data storage device is configured to determine second memory access rate information from the second data storage device; and
    a tiering manager configured to receive the first memory access rate information, to receive the second memory access rate information, to make a first determination that a first performance level of the information handling system when first data is stored in the first data storage device can be improved to a second performance level of the information handling system by swapping the first data to the second data storage device based upon the first memory access rate information and the second memory access rate information, and to swap the first data to the second data storage device in response to the first determination, wherein, prior to swapping the first data to the second data storage device, the tiering manager is further configured to halt a process on the processor.

2. The information handling system of claim 1, wherein the tiering manager is further configured to invoke a direct memory access (DMA) controller to swap the first data to the second data storage device.

3. The information handling system of claim 2, wherein the DMA controller is a smart data accelerator interface memory mover.

4. The information handling system of claim 2, wherein the tiering manager is further configured to rewrite a page table of the processor to reflect that the first data was swapped to the second data storage device.

5. The information handling system of claim 4, wherein the tiering manager is further configured to restart the process in response to rewriting the page table.

6. The information handling system of claim 1, wherein the tiering manager is configured to swap the first data to the second data storage device in further response to a page fault on the processor.

7. The information handling system of claim 1, wherein the first data is pinned data.

8. The information handling system of claim 1, wherein the tiering manager is further configured to make a second determination that a third performance level of the information handling system when second data is stored in the second data storage device can be improved to a fourth performance level of the information handling system by swapping the second data to the first data storage device based upon the first memory access rate information and the second memory access rate information, and to swap the second data to the first data storage device in response to the second determination.

9. The information handling system of claim 1, wherein the first memory access rate information includes a first memory access rate for a first region of the first memory device, and wherein the second memory access rate information includes a second memory access rate for a second region of the second memory device.

10. A method, comprising:
providing, on an information handling system, a processor including a first data storage device in a first memory tier, the first memory tier exhibiting first data storage attributes;
providing, by the processor, first memory access rate information for the first data storage device;
providing, on the information handling system, a second data storage device in a second memory tier, the second data storage device exhibiting second data storage attributes;
providing, by the second data storage device, second memory access rate information for the second data storage device;
receiving, by a tiering manager, the first memory access rate information and the second memory access rate information;
making a first determination that a first performance level of the information handling system when first data is stored in the first data storage device can be improved to a second performance level of the information handling system by swapping the first data to the second data storage device based upon the first memory access rate information and the second memory access rate information; and
swapping the first data to the second data storage device in response to the first determination, wherein, prior to swapping the first data to the second data storage device, the tiering manager is further configured to halt a process on the processor.

11. The method of claim 10, further comprising invoking a direct memory access (DMA) controller to swap the first data to the second data storage device.

12. The method of claim 11, wherein the DMA controller is a smart data accelerator interface memory mover.

13. The method of claim 11, further comprising rewriting a page table of the processor to reflect that the first data was swapped to the second data storage device.

14. The method of claim 13, further comprising restarting the process in response to rewriting the page table.

15. The method of claim 10, further comprising swapping the first data to the second data storage device in further response to a page fault on the processor.

16. The method of claim 10, wherein the first data is pinned data.

17. The method of claim 10, further comprising:
making a second determination that a third performance level of the information handling system when second data is stored in the second data storage device can be improved to a fourth performance level of the information handling system by swapping the second data to the first data storage device based upon the first memory access rate information and the second memory access rate information; and
swapping the second data to the first data storage device in response to the second determination.

18. An information handling system, comprising:
a processor including a first data storage device in a first memory tier, the first memory tier exhibiting first data storage attributes, wherein the processor is configured to provide first memory access rate information for the first data storage device;
a second data storage device in a second memory tier, the second data storage device exhibiting second data storage attributes, wherein the second data storage device is configured to provide second memory access rate information for the second data storage device; and
a tiering manager configured to receive first memory access rate information, to receive second memory access rate information, to make a first determination that a first performance level of the information handling system when first data is stored in the first data storage device can be improved to a second performance level of the information handling system by swapping the first data to the second data storage device based upon the first memory access rate information and the second memory access rate information, to halt a first process on the process in response to the first determination, to swap the first data to the second data storage device in response to the halting the first process, to make a second determination that a third performance level of the information handling system when second data is stored in the second data storage device can be improved to a fourth performance level of the information handling system by swapping the second data to the first data storage device based upon the first memory access rate information and the second memory access rate information, to halt a second process on the processor in response to the second determination, and to swap the second data to the first data storage device in response to halting the second process.

* * * * *